United States Patent

[11] 3,595,210

[72] Inventor Antioco Lampis
Via Ubisti 2, Nuoro, Italy
[21] Appl. No. 886,192
[22] Filed Dec. 18, 1969
[45] Patented July 27, 1971
[32] Priority Oct. 6, 1969
[33] Italy
[31] 53,591A/69

[54] ROTARY PISTON ENGINE
9 Claims, 3 Drawing Figs.

[52] U.S. Cl. ..................................... 123/8.41,
123/8.07
[51] Int. Cl. .................................... F02b 53/08
[50] Field of Search ........................... 123/8.41,
8.07, 8.09, 8.13, 8.15, 8.19, 8.23, 8.25, 8.29, 8.01,
8.43, 8.03

[56] References Cited
UNITED STATES PATENTS
2,193,178  3/1940  Laythorpe ..................... 123/8.41
3,213,838 10/1965  Douroux ....................... 123/8.41
3,294,071 12/1966  Turco .......................... 123/8.09
FOREIGN PATENTS
240,970 10/1925  Great Britain ................ 123/8.41

Primary Examiner—Clarence R. Gordon
Attorney—Paul and Paul

ABSTRACT: A rotary piston engine comprising a stator, two rotors of different diameters, each rotatably mounted in a separate chamber in the stator, gear means and a drive shaft for rotating the rotors in opposite directions, the rotor of smaller diameter having its axis out of alignment with the axis of the rotor of larger diameter so that during rotation of the rotors in opposite directions the rotor of smaller diameter will act as a compressor rotor carrying out also the induction phase while the rotor of larger diameter will carry out the explosion, expansion and exhaust phases.

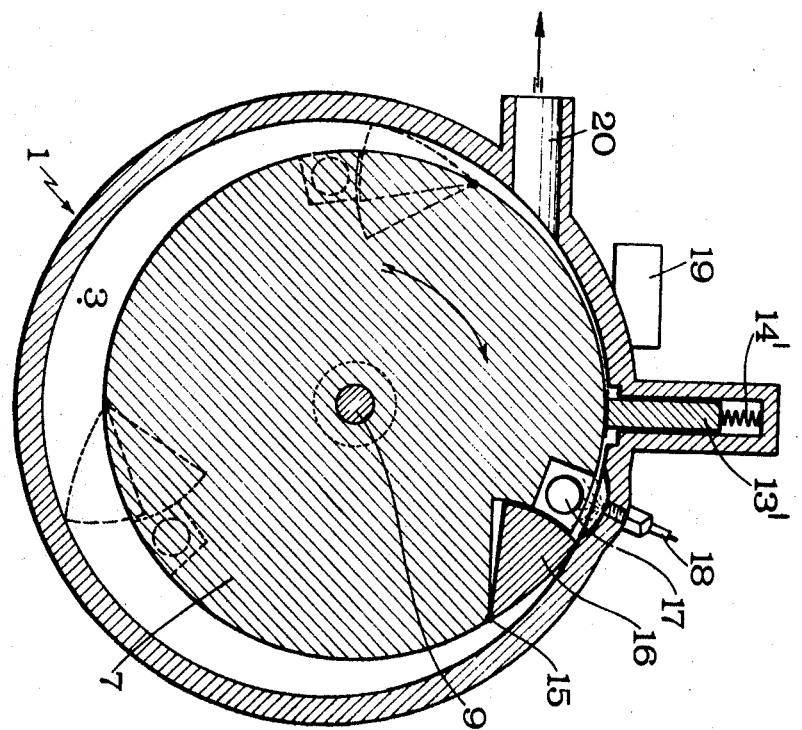
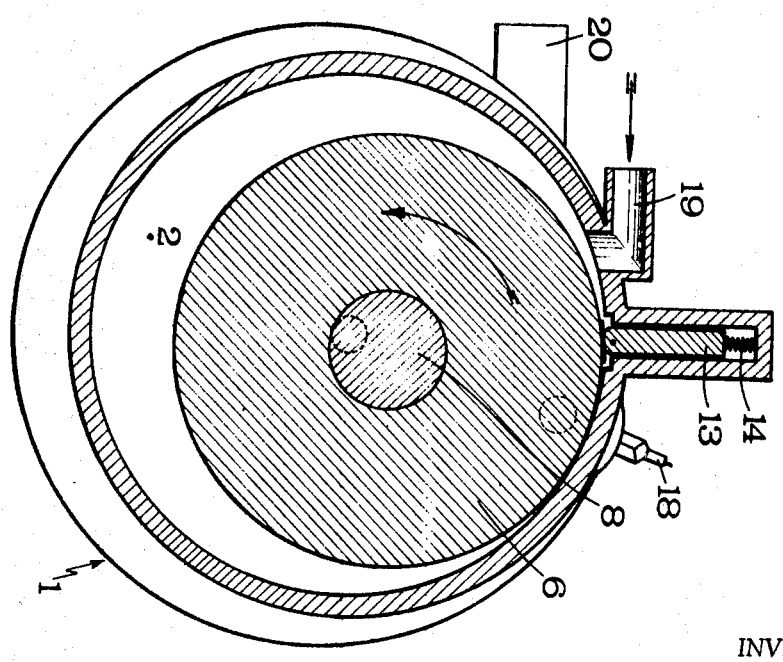

ROTARY PISTON ENGINE

This invention relates to a rotary piston engine of the type having two rotors of different diameters mounted out of alignment for rotation in opposite directions and eccentrically within a stator having two separate compartments or chambers of variable volume, communicating with each other, the chamber for the smaller rotor also serving as a compression chamber for the explosive mixture and serving for the induction stroke or phase while the rotor of larger diameter carries out the explosion, expansion and exhaust strokes or phases.

The engine according to the invention has the advantage over the known rotary engines that is can utilize large cylinder displacements with very small overall dimensions, thus permitting to obtain very high speeds without damage to the moving parts and facilitating lubrication and cooling operations.

A preferred embodiment of the invention will now be described by way of example and with reference to the accompanying drawings, in which:

FIG. 2 is a transverse section through the larger rotor of the engine of FIG. 1, taken on the line A-A in FIG. 1, and FIG. 3 is a transverse section through the smaller rotor of the engine of FIG. 1, taken on the line B-B in FIG. 1.

Figure 1:
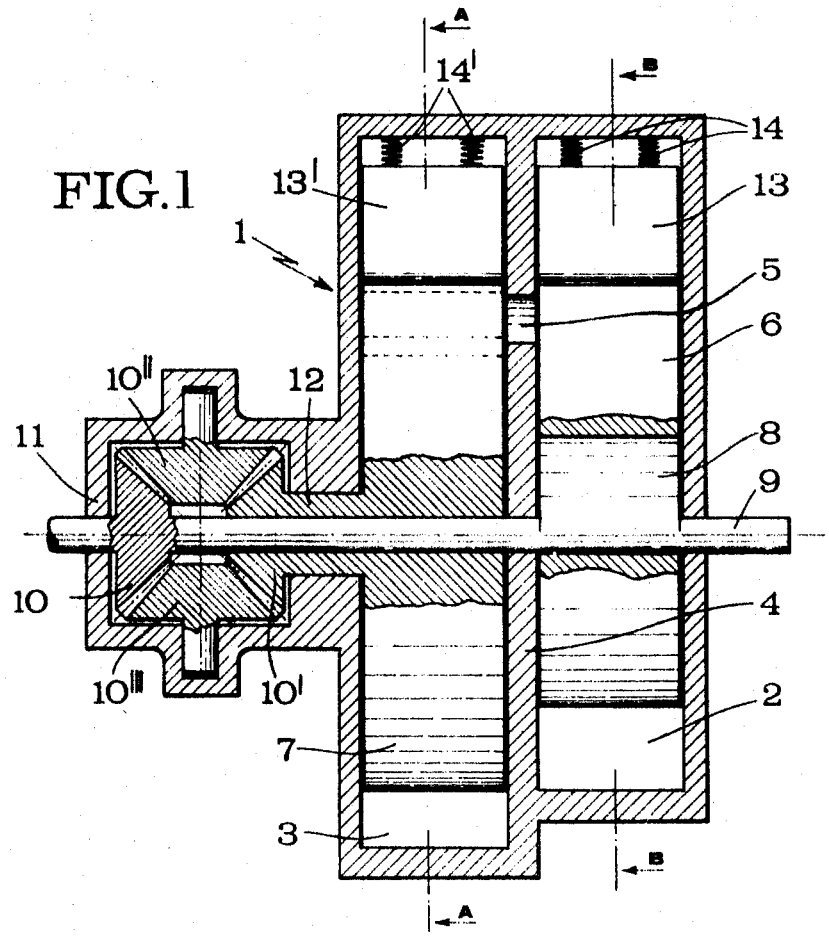
FIG. 1 is a longitudinal section through a rotary piston engine according to the invention.

As shown in FIG. 1, the engine comprises a stator 1 having therein tow separate adjacent cylindrical chambers 2 and 3 of different diameters and divided by a partition 4 provided with a communication aperture 5. The chambers 2 and 3 accommodate two rotors 6 and 7. The rotor 6 is of smaller diameter than the rotor 7 and rotatably carried on a drive shaft 9 extending coaxially through the chamber 2 but not through the axis of the rotor 6. An eccentric cam 8 extends coaxially through the rotor 6 and serves for mounting the latter on the shaft 9, the rotor 6 being freely rotatable on the eccentric cam 8. The rotor 7 of larger diameter is rotatably mounted on shaft 9 which extends through the axis thereof.

At one of its ends the drive shaft 9 carries a bevel gear 10 enclosed in a housing 11 formed integrally with the stator 1. The other end of the drive shaft 9 is firmly secured to the eccentric cam 8 on which the rotor 6 is freely rotatably mounted. The rotor 7 is provided with a bevel gear 10' connected with the rotor through a hollow shaft 12. The drive shaft 9 passes through the inner space of the hollow shaft 12. The bevel gear 10' is also located in the housing 11 and meshes with miter gears 10'', 10''' in turn meshing with the bevel gear 10. These bevel and miter gears are arranged in a closed cycle so that the two rotors will run in opposite directions.

The rotor 6 carries out the induction and compression phases and will therefore be referred to in the present specification as a "compressor rotor" while the rotor 7 carries out the explosion, expansion and exhaust phases and will therefore be referred to as a "drive rotor."

The volume of the chambers 2 and 3 can be varied by slides 13, 13' which are constantly pressed against the periphery of the rotors by elastic means 14. Further a skid 16 (FIG. 2) is pivotally mounted by means of a pivot 15 on the outer periphery of the rotor 7 to constantly press against the inner periphery of the stator 1. The skid 16 has a substantially triangular configuration and is located near an explosion chamber 17 to cooperate therewith. The ignition of the explosive mixture is produced by a spark plug 18.

Due to the rotation of the rotors 6 and 7 in opposite directions, the rotor 6 and the explosion chamber 17 in the rotor 7 symmetrically approach the communication aperture 5 between the chambers 2 and 3 until they are in alignment in the exact moment of explosion. The explosive mixture compressed by the rotor 6 will remain in the space of the aperture 5 formed by the thickness of the partition 4 until the explosion chamber 17 comes up on the other side in alignment with the aperture 5. For the entire duration of the compression phase produced by the rotor 6, the aperture 5 is closed by the rotor 7 and is not opened until the compressed mixture is removed and is closed again thereafter from the moment of explosion of the mixture until completion of the next phase.

In the described and illustrated embodiment, one explosion occurs during each rotation of the drive shaft 9, but obviously two or more units may be connected in series to increase the engine power.

The invention also provides for the possibility of producing more explosions during each rotation of the drive shaft by varying the ratio of the bevel gears 10 so that the rotor 6 will carry out several revolutions during each revolution of the rotor 7. For this purpose several explosion chambers 17 and associated skids 16 are shown in dash lines in FIG. 2, the explosion chambers and skids being equidistantly spaced about the circumference of the rotor 7 and corresponding in number to the number of revolutions made by the rotor 6 during each revolution of the rotor 7 (in the present embodiment there being three explosion chambers and skids).

Independently of the number of explosions only one induction inlet 19, one exhaust outlet and one spark plug 18 will be required.

According to a modification, not shown, the chamber 3 may have an elliptical form, instead of being of circular form, as shown, and in this case the drive shaft 9 must extend therethrough at one of the focuses.

I claim:

1. A rotary piston engine comprising a stator, two rotors of different diameters, each rotatably mounted in a separate chamber in the stator, gear means for rotating the rotors in opposite directions, and a drive shaft extending from the gear means through the center of the rotor of larger diameter without being connected thereto and into the rotor of smaller diameter having its axis out of alignment with the axis of the rotor of larger diameter, said chambers communicating with each other and varying in volume during rotation of the rotors, said chamber accommodating the rotor of smaller diameter serving as a compression chamber for the explosive mixture and carrying out the induction phase, said rotor of larger diameter carrying out the explosions, expansion and exhaust phase.

2. A rotary piston engine as claimed in claim 1, wherein the two chambers housing the rotors communicate with each other through an aperture provided in a partition dividing them and a recess is provided in the rotor of larger diameter to serve as an explosion chamber when it comes into alignment with said aperture.

3. A rotary piston engine as claimed in claim 2, wherein the recess serving as an explosion chamber is provided on the outer periphery of the rotor of larger diameter adjacent a substantially triangular skid pivotally mounted on the outer periphery of the rotor of larger diameter and in alignment with said periphery when the skid is in its retracted position, the skid being normally urged against the inner peripheral wall of the chamber housing the rotor of larger diameter serving as a drive rotor as different from the rotor of smaller diameter serving as a compressor rotor, and a slide is provided in the stator and is constantly urged against the outer periphery of the drive rotor to provide for variation of the volume of the drive rotor chamber, the sealing thereof and one explosion of the explosive mixture for each revolution of the drive rotor.

4. A rotary piston engine as claimed in Claim 3, wherein the arrangement is such that during rotation of the rotors in opposite directions the compressor rotor and the explosion chamber in the drive rotor symmetrically approach the communication aperture between the two chambers until they are in alignment therewith in the exact moment of the explosion and the explosive mixture compressed by the compressor rotor will remain within the space defined by said communication aperture extending through the thickness of the partition between the two chambers, until the explosion chamber comes up in alignment with said communication aperture and the drive rotor will not clear said communication aperture until the compressed explosive mixture is removed, said drive rotor automatically closing said communication aperture immediately after the explosion until the next phase.

5. A rotary piston as claimed in claim 1, wherein the drive shaft has mounted thereon at one of its ends a bevel gear accommodated in a housing formed integrally with the stator and the other end of the drive shaft is firmly secured to an eccentric cam on which the rotor of smaller diameter is freely rotatably mounted, the rotor of larger diameter being provided with a hollow shaft accommodating in its interior said drive shaft and said bevel gear meshes with miter gears in turn meshing with a bevel gear at the end of said hollow shaft to form a closed power transmission cycle and thus ensure rotation of the rotors in opposite directions.

6. A rotary piston engine as claimed in claim 1, wherein the arrangement of the rotors, gear means and drive shaft is such as to produce one explosion of the explosive mixture during each rotation of the rotors.

7. A rotary piston engine as claimed in claim 1, wherein the gear means comprises bevel gears interposed between the drive shaft and a hollow shaft extending from the rotor of larger diameter and by selecting an appropriate transmission ratio of the bevel gears it is possible to obtain more than one revolution of the rotor of smaller diameter during each revolution of the rotor of larger diameter and for each revolution of the rotor of smaller diameter an explosion chamber and an adjacent pivotally mounted substantially triangular skid are provided on the outer periphery of the rotor of larger diameter to carry out more than one explosion of the explosive mixture during each revolution of the rotor of larger diameter, said skid being in alignment with the outer periphery of the rotor of larger diameter in their retracted position and being normally urges against the inner peripheral wall of the chamber housing the rotor of larger diameter.

8. A rotary piston engine as claimed in claim 1, wherein the chamber accommodating the rotor of larger diameter is of circular form in cross section.

9. A rotary piston engine as claimed in claim 1, wherein the chamber accommodating the rotor of larger diameter has an elliptical form in cross section and the drive shaft extends therethrough at one of the focuses of the ellipse.